United States Patent [19]

Wrobel

[11] Patent Number: 4,609,208

[45] Date of Patent: Sep. 2, 1986

[54] WIRE IDENTIFICATION LABEL PAD

[75] Inventor: Norbert E. Wrobel, Marine, Minn.

[73] Assignee: Minnesota Mining and Manufacturing Company, St. Paul, Minn.

[21] Appl. No.: 776,593

[22] Filed: Sep. 16, 1985

[51] Int. Cl.⁴ ........................ B42D 15/00; B42D 5/00; B32B 33/00

[52] U.S. Cl. .................................... 283/81; 281/15 R; 156/299

[58] Field of Search ............... 281/15 R; 282/DIG. 2; 283/81; 156/264, 289, 291, 292, 299

[56] References Cited

U.S. PATENT DOCUMENTS

| | | | |
|---|---|---|---|
| 231,366 | 8/1880 | Small | 283/81 |
| 619,054 | 2/1899 | Strauss et al. | 283/81 |
| 842,348 | 1/1907 | Shiley | 283/81 |
| 2,030,135 | 2/1936 | Carpenter | 27/67 |
| 2,248,317 | 7/1941 | Van Cleef | 283/81 |
| 2,528,602 | 11/1950 | Magit | 15/209 |
| 2,574,152 | 11/1951 | Lewis | 206/56 |
| 2,724,847 | 11/1955 | Krasno | 15/104 |
| 2,769,480 | 11/1956 | Diederich | 156/299 |
| 3,083,393 | 4/1963 | Nappi | 15/215 |
| 3,226,862 | 1/1966 | Gabruk | 283/81 |
| 3,373,457 | 3/1968 | Rouch, Jr. | 15/104 |
| 3,896,246 | 7/1975 | Brady, Jr. | 428/41 |
| 4,262,835 | 4/1981 | Wrobel | 225/25 |

FOREIGN PATENT DOCUMENTS

| | | | |
|---|---|---|---|
| 1204080 | 9/1970 | United Kingdom | 283/81 |

*Primary Examiner*—Paul A. Bell
*Assistant Examiner*—Paul M. Heyrana, Sr.
*Attorney, Agent, or Firm*—Donald M. Sell; James A. Smith; Terryl K. Qualey

[57] ABSTRACT

A pad of wire identification labels comprising a relatively stiff rectangular pad backing and a multiplicity of layers of a pressure sensitive adhesive tape on the pad backing. A narrow band of a release liner is similarly adhered to the pressure sensitive adhesive surface of each layer of tape along one edge and the layers of tape and the release liner are slit into a multiplicity of long, narrow, parallel strips defining the individual labels. Each of the narrow label strips has a multiplicity of the same indicia spaced along its length.

4 Claims, 5 Drawing Figures

WIRE IDENTIFICATION LABEL PAD

FIELD OF THE INVENTION

The present invention relates to labels for marking electrical wires to identify electrical circuits.

BACKGROUND OF THE INVENTION

Wire identification labels are frequently affixed to electrical wires as they are installed to identify the electrical circuits created. One popular form of wire marker is pressure sensitive adhesive tape printed with indicia and supplied in rolls as disclosed in U.S. Pat. No. 4,262,835 or in precut strips as disclosed in U.S. Pat. No. 3,896,246. Wire marking labels provided in precut strips have had a nonadhesive backing for each layer of tape as in U.S. Pat. No. 3,896,246. The backing, which is disposed of, is thus a significant part of the cost of the product. Moreover, in use the workman normally must grasp the label with one finger contacting the pressure sensitive adhesive surface of the label while removing it from the backing and applying it to the wire and if his fingers are dirty or greasy the trailing end of the label may not adhere well and it may end up standing up away from the wire as a "flag".

SUMMARY OF THE INVENTION

The present invention provides a pad of wire identification labels having a relatively stiff rectangular pad backing and a multiplicity of rectangular layers of a pressure sensitive adhesive tape on the pad backing, the tape having a flexible opaque backing. A narrow band of a release liner is similarly adhered to the pressure sensitive adhesive surface of each layer of the tape along one edge thereof. The layers of tape are slit into a multiplicity of long, narrow parallel strips, the slits running perpendicular to the one edge of each tape layer and the edge parallel thereto and extending through the layers of tape and release liner. Indicia are printed on the layers of tape, each of the narrow strips of tape having a multiplicity of the same indicia spaced along its length. The narrow band of release liner and the pad backing are the only disposable portions of the product. Also, the release liner provides a protection for the adhesive at the end of each strip where it is to be grasped by the workman, and the release liner is removed as the label is wrapped around the wire so that the workman never touches the adhesive surface of the tape.

THE DRAWING

DESCRIPTION OF THE PREFERRED EMBODIMENTS

Figure 1:
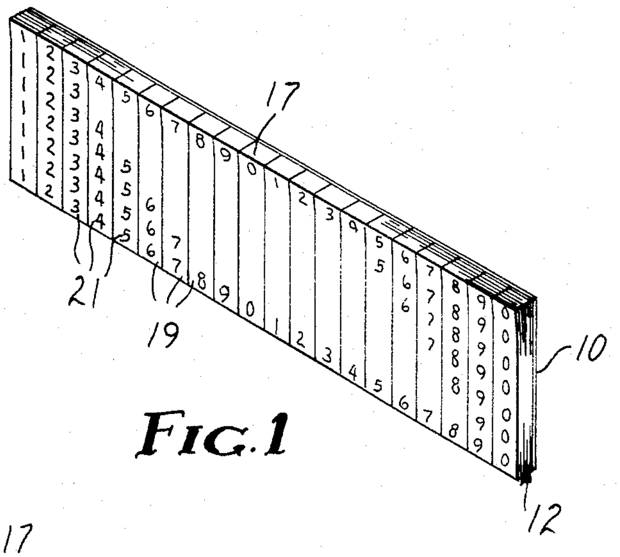
FIG. 1 is a perspective view of the front, top and one end of a pad of wire identification labels constructed in accordance with the present invention.
Figure 2:
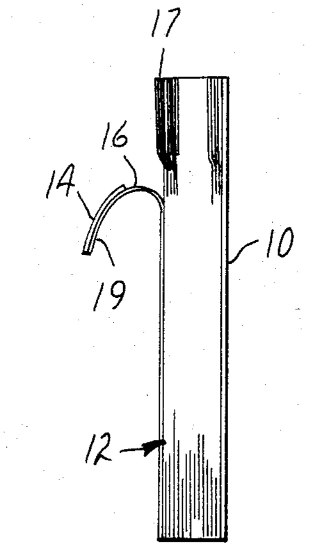
FIG. 2 is an end view of the pad of labels with one end of a label bent over for removal.
Figure 3:
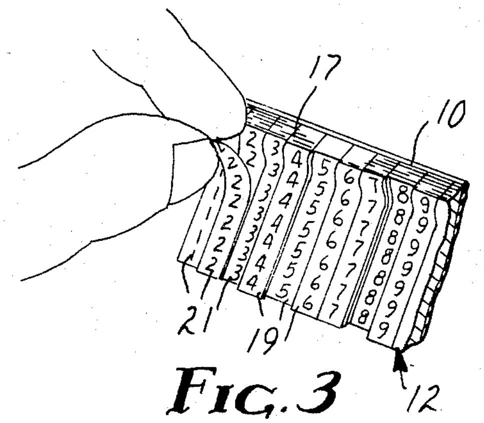
FIG. 3 is a perspective view illustrating the removal of one label from the pad.
Figure 4:
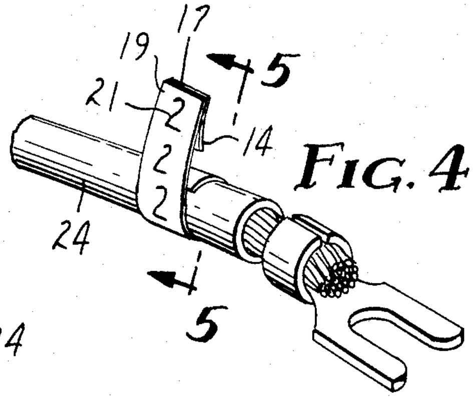
FIG. 4 is a perspective view of an electrical wire with a label from the pad of FIGS. 1–3 partially applied and with the release liner still in place at the end of the label.
Figure 5:
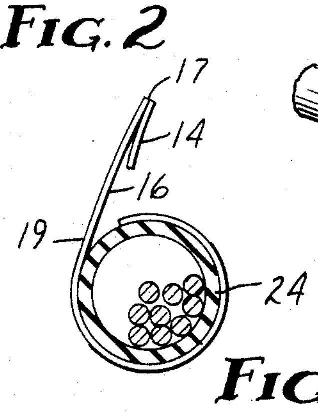
FIG. 5 is a transverse cross-sectional view taken generally along line 5—5 of FIG. 4.

The pad of wire identification labels of the present invention comprises a relatively stiff rectangular pad backing 10 and a multiplicity of rectangular layers of a pressure sensitive adhesive tape 12 on the pad backing. The tape 12 has a flexible opaque backing.

A narrow band of a release liner 14 is similarly adhered to the pressure sensitive adhesive surface 16 of each layer of the tape 12 along one edge 17 thereof. The release liner 14 is preferably stiffer than the tape backing.

The layers of tape 12 are slit into a multiplicity of long, narrow, parallel strips 19. The slits run perpendicular to the edge 17 of each tape layer and the edge parallel thereto, and extend through the layers of tape 12 and release liner 14. Indicia 21 are printed on the layers of tape 12. Each of the narrow strips 19 of tape 12 have a multiplicity of the same indicia 21 spaced along its length. In the illustrated construction the indicia on each of the strips 19 of tape 12 are equally spaced along the length of the strip of tape and the adjacent strips contain different indicia. Numerical indicia are illustrated in columnar fashion on each strip of tape 19, although it will be readily apparent that letters may also be used and that the indicia may be turned 90 degrees so that they are arranged in a row on each strip.

In one specific construction of the present invention the pad backing 10 is a piece of polystyrene six inches long, 1.5 inches wide and 15 mils thick. The tape 12 has two presently preferred constructions. The first has a 5 to 6.5 mil polyethylene terephthalate fiber reinforced epoxy film backing with pressure sensitive adhesive on one face comprising a white pigmented cross-linked acrylic adhesive the indicia 21 are a black flexographic ink printed on the nonadhesive surface of the backing, and a coating acting as a print sealant and a low adhesion backsize is applied over the indicia bearing surface of the backing. The second preferred tape construction has a 1.6 mil biaxially oriented, transparent polypropylene film backing, a modified acrylate pressure sensitive adhesive and a white flexographic ink coating the nonadhesive surface of the backing. The indicia 21 are a black flexographic ink printed on the white background ink, a 1.2 mil biaxially oriented transparent polypropylene film is bonded to the indicia bearing surface by a synthetic rubber resin adhesive to protect the indicia, and a low adhesion backsize is coated over the protective film. The release liner 14 is a 43 pound, silicone coated, kraft paper. The layers of tape 12 with release liner 14 applied are preferrably laid up on the pad backing 10 and then die cut to the pad backing 10 to form the narrow label strips 19. To prevent the die from cutting into the pad backing 10 (which might then break along the cut lines), a sacrificial layer of material, for example a layer of tape without a release liner, is preferrably provided between the pad backing 10 and the first layer of indicia bearing tape 12.

In use, the workman grasps the end of a label strip 19 between his thumb and first finger at the end of the strip having the release liner 14. The end of the strip 19 not bearing the release liner is first contacted against the electrical wire 24 to be marked, and the strip is then wound around the wire. As the end of the strip 19 bearing the release liner 14 approaches the wire 24, the workman bends the end of the strip to cause the release liner 14 which is stiffer than the tape 12 to separate from the tape. The workman then removes the release liner 14 and completes the application of the tape 12 to the wire 24.

I claim:

1. A pad of wire identification labels, comprising:

a relatively stiff rectangular pad backing, a multiplicity of rectangular layers of a pressure sensitive adhesive tape on said pad backing, said tape having a flexible opaque backing, a narrow band of a release liner similarly adhered to the pressure sensitive adhesive surface of each layer of said tape along one edge thereof, said layers of tape being slit into a multiplicity of long, narrow, parallel strips, the slits running perpendicular to said one edge of each tape layer and the edge parallel thereto and extending through the layers of tape and release liner, and indicia on said layers of tape, each of said narrow strips of tape having a multiplicity of the same indicia spaced along its length.

2. The pad of wire identification labels of claim 1 wherein said release liner is stiffer than said tape backing.

3. The pad of wire identification labels of claim 1 wherein said indicia on each of said narrow strips of tape are equally spaced along the length of said strip of tape.

4. The pad of wire identification labels of claim 2 wherein adjacent narrow strips of tape contain different indicia.

* * * * *